(12) United States Patent  
Jeon

(10) Patent No.: US 11,097,707 B2
(45) Date of Patent: Aug. 24, 2021

(54) BREAK BOOSTER OF THE VEHICLE

(71) Applicant: MANDO CORPORATION, Pyeongtaek-si (KR)

(72) Inventor: Soo Yong Jeon, Gunpo-si (KR)

(73) Assignee: Mando Corporation, Pyeongtaek-si (KR)

( * ) Notice: Subject to any disclaimer, the term of this patent is extended or adjusted under 35 U.S.C. 154(b) by 47 days.

(21) Appl. No.: 16/007,914

(22) Filed: Jun. 13, 2018

(65) Prior Publication Data

US 2018/0354482 A1 Dec. 13, 2018

(30) Foreign Application Priority Data

Jun. 13, 2017 (KR) .................. 10-2017-0073802

(51) Int. Cl.
*B60T 13/57* (2006.01)
*B60T 13/14* (2006.01)

(52) U.S. Cl.
CPC ............. *B60T 13/57* (2013.01); *B60T 13/143* (2013.01)

(58) Field of Classification Search
CPC ......... B60T 13/57; B60T 13/143; B60T 13/52
USPC ....................................... 91/376 R
See application file for complete search history.

(56) References Cited

U.S. PATENT DOCUMENTS

| | | | | |
|---|---|---|---|---|
| 2,647,501 A | * | 8/1953 | Rich .................. | F01L 1/32 123/90.29 |
| 3,499,288 A | * | 3/1970 | Randol ................ | B60T 13/567 60/554 |
| 3,856,105 A | * | 12/1974 | Lewis ................ | B60K 31/0008 180/169 |
| 4,776,256 A | * | 10/1988 | Gath .................... | B60T 13/143 60/551 |
| 6,119,578 A | * | 9/2000 | Leboisne .............. | B60T 17/002 91/376 R |
| 6,324,958 B1 | | 12/2001 | Ikeda | |
| 6,516,705 B2 | * | 2/2003 | Vermoesen ........... | B60T 8/3275 91/376 R |
| 2010/0109428 A1 | * | 5/2010 | Yamashita ............. | B60T 13/57 303/31 |
| 2015/0021977 A1 | * | 1/2015 | Miwa ...................... | B60T 8/17 303/15 |

FOREIGN PATENT DOCUMENTS

CN 205632465 U 10/2016
EP 0220098 A1 4/1987
(Continued)

OTHER PUBLICATIONS

Korean Office Action dated Jul. 16, 2018 issued in Korean Patent Application No. 10-2017-0073802.

(Continued)

*Primary Examiner* — Angelisa L. Hicks
(74) *Attorney, Agent, or Firm* — Morgan, Lewis & Bockius LLP

(57) ABSTRACT

A brake booster is provided. The brake booster includes a poppet valve body configured to open a path for atmospheric pressure to be introduced into a variable pressure chamber by an operation rod linked with a brake pedal, and a return spring structure disposed on an outer side of the poppet valve body and configured to adjust an elastic force provided to the poppet valve body when an input of the brake pedal is released.

8 Claims, 3 Drawing Sheets

(56) References Cited

FOREIGN PATENT DOCUMENTS

| KR | 2002-0005910 A | 1/2002 |
| KR | 10-2008-0101360 A | 11/2008 |
| KR | 10-2010-0030286 A | 3/2010 |
| KR | 10-2011-0109520 A | 10/2011 |
| KR | 10-1675570 B1 | 11/2016 |

OTHER PUBLICATIONS

Chinese Office Action dated Jun. 2, 2020 in Chinese Application No. 2018106076873.

* cited by examiner

BREAK BOOSTER OF THE VEHICLE

TECHNICAL FIELD

The present invention relates to a brake booster of a vehicle.

BACKGROUND ART

Generally, a brake apparatus (brake system) of a vehicle is an apparatus configured to generate a braking force to a running vehicle to prevent the vehicle from arbitrarily moving and is operated by a hydraulic pressure generated and supplied from a master cylinder, generally due to an operation of a brake pedal.

That is, a brake pedal stepped on by a driver to generate a braking force, a brake booster provided to boost a pedal force of the brake pedal using a difference between a negative pressure (a vacuum pressure) and an atmospheric pressure generated from an engine, a master cylinder configured to convert the pedal force of the brake pedal to a hydraulic pressure, a brake main body provided to receive the hydraulic pressure from the master cylinder to generate a substantive braking force, and the like are mounted in the vehicle.

That is, the brake booster is a device configured to boost an operating force of the brake pedal in order to operate the master cylinder, wherein two chambers including a constant pressure chamber forming a vacuum and a variable pressure chamber configured to introduce atmospheric air are formed in the brake booster, and both the constant pressure chamber and the variable pressure chamber initially maintain a vacuum.

Since the brake booster having the above described two chambers includes a poppet valve opened by an operation rod linked with the brake pedal, the atmospheric air may be introduced into the variable pressure chamber when the brake pedal is operated.

Generally, since the poppet valve includes a return spring, which is compressed and stretched when receiving an input of the brake pedal, therein, the poppet valve may return to an initial state using an elastic force of the return spring when the input of the brake pedal is released.

However, a conventional return spring has a coupling structure which provides an elastic restoring force to return the poppet valve to an initial state, and thus generates vibrations by directly receiving an impulsive load applied to the brake booster when the brake pedal is suddenly operated.

Since vibration generation of the return spring is inversely transferred to the brake pedal through the poppet valve and an operation rod, and thus causes a driver that steps on the brake pedal to feel vibrations of the brake booster, the vibration generation of the return spring causes difficulty in adjusting an elastic force in a limited space included in the poppet valve.

DISCLOSURE

Technical Problem

The present invention is directed to providing a brake booster configured to adjust an elastic force to satisfy an operation feeling required by a driver that steps on a brake pedal.

Technical Solution

An aspect of the present invention provides a brake booster including a poppet valve body configured to open a path for atmospheric pressure to be introduced into a variable pressure chamber by an operation rod linked with a brake pedal; and a return spring structure disposed on an outer side of the poppet valve body and configured to adjust an elastic force provided to the poppet valve body when an input of the brake pedal is released.

The return spring structure may include a spring housing coupled to the outside of the poppet valve body and having the operation rod movably formed therein, and a return spring installed in the spring housing to provide an elastic force to the outer surface of the poppet valve body.

The return spring structure may further include a retainer located at one end portion of the spring housing, having a coupling hole formed in a center portion thereof so that the operation rod is inserted into and coupled to the retainer, and configured to accommodate the return spring on one surface thereof.

The retainer may include a support member having a plate shape with an accommodation groove, which is configured to accommodate the return spring, in one surface thereof, and a coupling member formed to protrude from the one surface of the support member in a drum shape.

A diameter of the accommodation groove may be greater than or equal to a diameter of the return spring.

The coupling member may include a hook portion formed to protrude inward from one end portion thereof and the operation rod may have a hook protrusion formed on one side thereof so that the hook portion is hooked.

The coupling member may have a slot formed to extend in a longitudinal direction, wherein the slot may include a plurality of slots, and the plurality of slots may be formed to be spaced apart from each other along a circumferential direction of the coupling member.

An air vent hole may be formed in one side of the support member to prevent noises generated by irregular fluid introduction.

The spring housing may have a wrinkled portion formed to be flexible in an outer surface thereof.

A flow hole may be formed in one surface of the spring housing so that a fluid may be introduced.

Advantageous Effects

Since a brake booster according to an embodiment of the present invention has a return spring structure disposed on an outer side of a poppet valve body, an elastic force can be easily adjusted and thus an operation feeling felt by a driver when a pedal is stepped on can be matched to an individual characteristic of the driver.

Further, the brake booster according to the embodiment of the present invention can include a retainer and thus a return spring can be easily fixed.

MODES OF THE INVENTION

Figure 1:
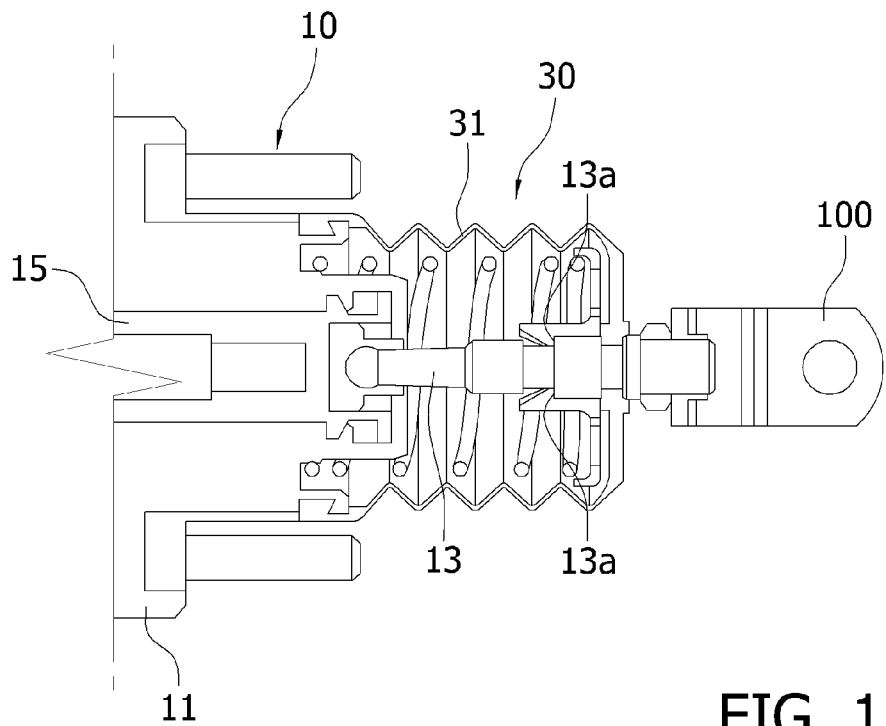
FIG. 1 is a cross-sectional view illustrating a brake booster according to an embodiment of the present invention.

Hereinafter, exemplary embodiments of the present invention will be described in detail with reference to the accompanying drawings which may allow one of ordinary skill in the art to easily perform the present invention. The present invention may be implemented in various forms and is not limited to the following embodiments. Components not related to the description are omitted in the drawings to clearly describe the present invention, and the same reference symbols are used for the same or similar components in the description.

It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Figure 2:
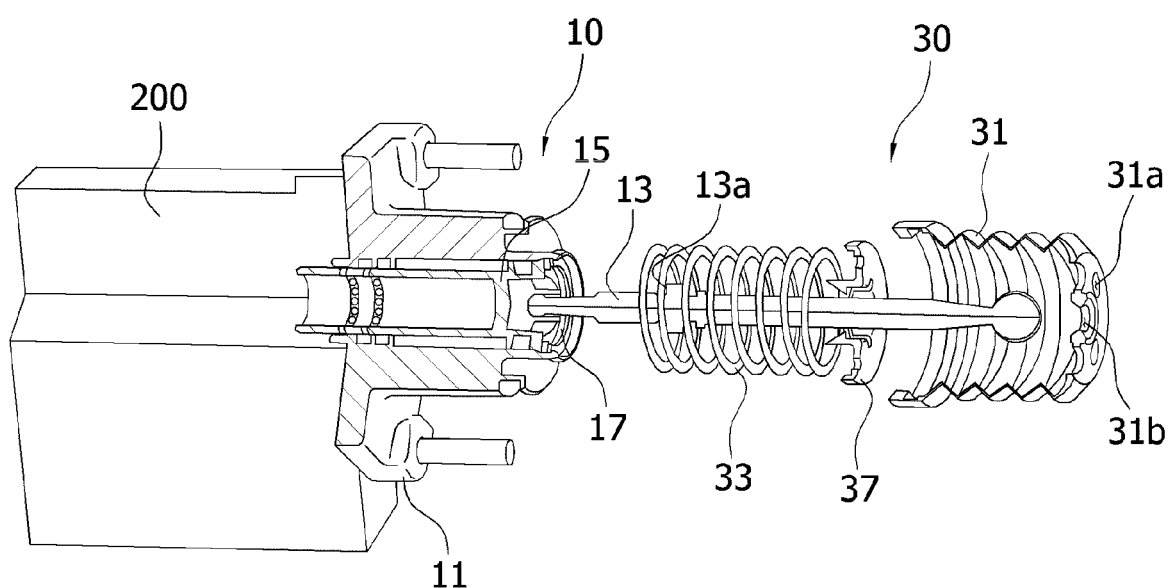
FIG. 2 is an exploded cross-sectional perspective view illustrating the brake booster according to the embodiment of the present invention.
Figure 3:
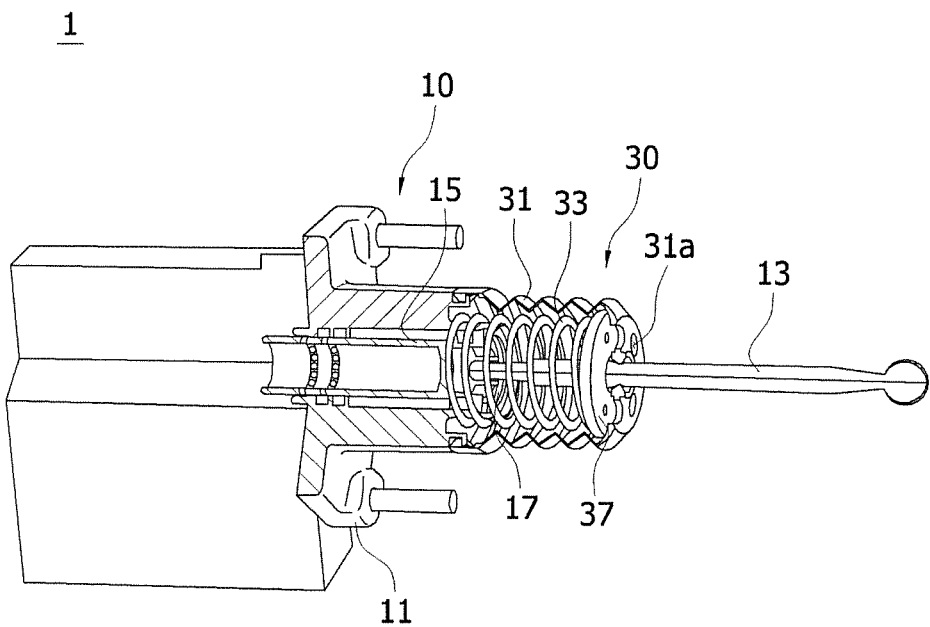
FIG. 3 is a cross-sectional perspective view illustrating the brake booster according to the embodiment of the present invention.

FIG. 1 is a cross-sectional view illustrating a brake booster according to an embodiment of the present invention. FIG. 2 is an exploded cross-sectional perspective view illustrating the brake booster according to the embodiment of the present invention. FIG. 3 is a cross-sectional perspective view illustrating the brake booster according to the embodiment of the present invention.

As shown in FIG. 1, in the following description, a direction from a retainer to a return spring is determined to be described as a frontward direction, and a direction from the return spring to the retainer is described to be determined as a rearward direction.

Referring to FIG. 1, a brake booster 1 according to an embodiment of the present invention includes a poppet valve body 10 and a return spring structure 30. In this case, the brake booster 1 may be divided into a constant pressure chamber mounted in a vehicle and forming a vacuum, and a variable pressure chamber 200 configured to introduce atmospheric air. Further, the brake booster 1 may boost a pedal force of the brake pedal 100 using a difference between a negative pressure (a vacuum pressure) and an atmospheric pressure generated from an engine when a driver steps on the brake pedal 100. Meanwhile, the brake booster 1 may include an electronic booster.

According to the embodiment of the present invention, the poppet valve body 10 may be opened and closed to introduce the atmospheric air into the variable pressure chamber 200 or prevent introduction of the atmospheric air into the variable pressure chamber 200. Further, the poppet valve body 10 may include a valve housing 11, a valve member 15, and an operation rod 13.

Accordingly, the poppet valve body 10 is opened by receiving pressure from the operation rod 13 linked with an operation of the brake pedal to move, and thus may introduce the atmospheric air into the variable pressure chamber 200 during operation of the brake pedal 100.

According to the embodiment of the present invention, the operation rod 13 may be installed in an inner center portion of the valve housing 11 and linked with the brake pedal 100 to transfer a pedal force. In this case, the valve member 15 may be coupled to a front side of the operation rod 13. Further, the operation rod 13 may be coupled to a return spring structure to be movable in the return spring structure 30. In this case, a hook protrusion 13a may be formed on one side of the operation rod 13 and may be fixed to a hook portion 39a of a coupling member 39 which will be described below.

Meanwhile, the valve member 15 may be formed to slide in a longitudinal direction of the operation rod in the valve housing 11 by the operation rod 13. In this case, a fixing member 17 may be installed on a rear end portion of the valve housing to prevent the valve member 15 from escaping the valve housing 11.

According to the embodiment of the present invention, the fixing member 17 may be a circular-shaped spring steel as a circlip. In this case, the fixing member 17 may be inserted into a groove formed in an end portion of the valve housing to fix the valve member 15 inserted into the valve housing so that the valve member 15 is prevented from escaping.

Meanwhile, the brake booster 1 according to the embodiment of the present invention may easily adjust an elastic force by installing the return spring structure 30 at the outside of the poppet valve body 10, that is, by installing the return spring structure in a space other than a limited area inside the poppet valve body, and accordingly, an operation feeling felt by the driver when the pedal is stepped on may be matched to an individual characteristic of the driver.

Figure 4:
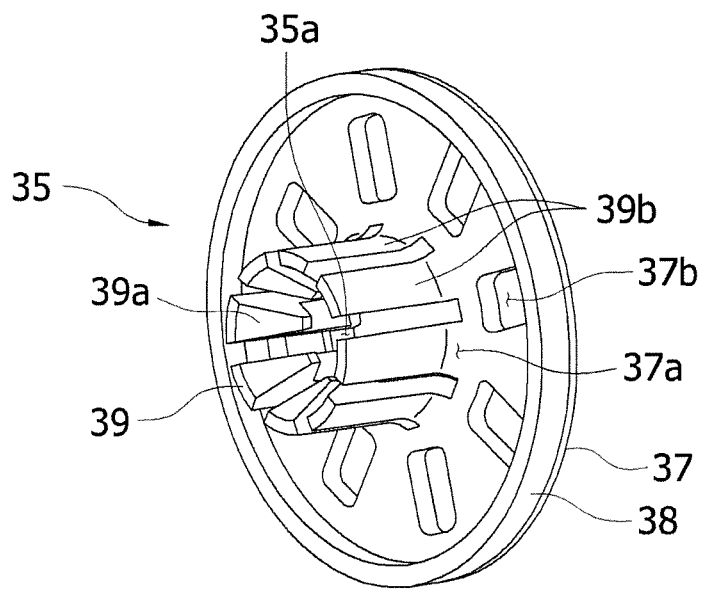
FIG. 4 is a perspective view illustrating a retainer of the brake booster according to the embodiment of the present invention.
Figure 5:
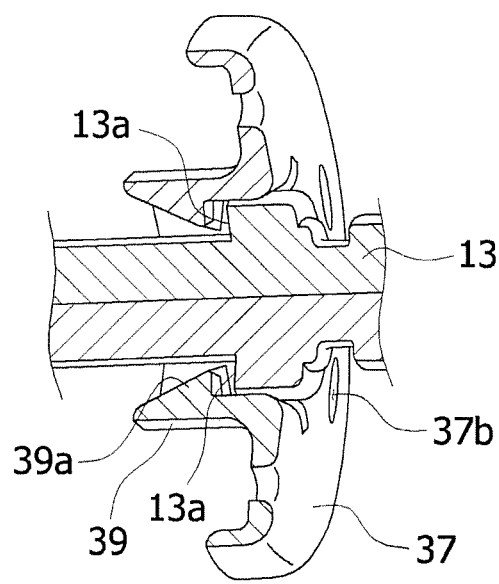
FIG. 5 is a cross-sectional perspective view illustrating a state in which the retainer of the brake booster according to the embodiment of the present invention is coupled to an operation rod.

FIG. 4 is a perspective view illustrating a retainer of the brake booster according to the embodiment of the present invention. FIG. 5 is a cross-sectional perspective view illustrating a state in which the retainer of the brake booster according to the embodiment of the present invention is coupled to an operation rod.

Meanwhile, according to the embodiment of the present invention, the return spring structure 30 may be elastically transformed when the poppet valve body 10 receives an input of the brake pedal 100 and may apply an elastic restoring force to the poppet valve body when the input of the brake pedal 100 is released. To this end, the return spring structure 30 may include a spring housing 31, a return spring 33, and a retainer 35.

According to the embodiment of the present invention, the spring housing 31 may be coupled to the rear end portion of the valve housing 11. Further, the spring housing 31 may have a hollow portion so that the operation rod 13, the return spring 33, and the retainer 35 may be installed in the spring housing 31. A first coupling hole 31b may be formed in a center portion of the spring housing 31 so that the operation rod 13 may be inserted and coupled.

In this case, the spring housing 31 has a cylindrical shape, and a wrinkled portion configured to extend in a longitudinal direction may be formed on an outer side of the spring housing 31. Accordingly, the spring housing 31 may adjust flexibility to adjust the elastic force together with the return spring 33. Further, the spring housing 31 may have a flow hole 31a formed in a rear end surface thereof. In this case, the atmospheric air may flow in the spring housing 31 through the flow hole 31a.

Meanwhile, according to the embodiment of the present invention, the return spring 33 may have a coil spring shape and apply an elastic restoring force to the valve member 15 when the input of the brake pedal 100 is released.

According to the embodiment of the present invention, the retainer 35 may support the return spring to prevent the return spring 33 from escaping. In this case, the retainer 35 may include a support member 37 and the coupling member 39. Further, a second coupling hole 35a may be formed in a center portion of the retainer 35 so that that the operation rod 13 may be inserted and coupled.

According to the embodiment of the present invention, the support member 37 may have a disk shape. Further, the support member 37 may have an accommodation groove 37a formed therein to accommodate the return spring 33 at a front surface thereof. In this case, a diameter of the accommodation groove 37a may be greater than or equal to a diameter of the return spring 33 and thus the return spring may be fixed in the accommodation groove 37a.

Meanwhile, an air vent hole 37b configured to pass through the front surface and a rear surface of the support member 37 may be formed in the support member 37. In this case, the support member 37 may prevent noise generation by circulating non-uniform airflow through the air vent hole 37b when introduction of the non-uniform airflow occurs.

Further, a protrusion 38 configured to protrude frontward may be formed on an outer edge of the support member 37. The protrusion 38 serves to prevent separation of the return spring 33.

In addition, the coupling member 39, which is configured to protrude from the support member 37, may be formed on a front surface thereof. In this case, the coupling member 39 may be formed to extend frontward from the second coupling hole 35a. In addition, the coupling member 39 may have a hook structure to be fixed to the hook protrusion 13a of the operation rod 13. In this case, the coupling member 39 coupled to the operation rod 13 through the hook protrusion 13a may have an excellent fixing force so as to be prevented from escaping when being assembled.

That is, the hook portion 39a configured to protrude in an inward direction may be formed on an end portion of the coupling member 39. In this case, the hook portion 39a may be formed to have various heights which protrude in an inward direction from a front end to a rear to have an excellent fixing force with the hook protrusion 13a.

Further, a slot 39b configured to extend in a longitudinal direction may be formed in the coupling member 39. In this case, the slot 39b may be formed in plural, and the plurality of slots 39b may be disposed to be spaced apart from each other at the same interval in a circumferential direction of the coupling member 39. In this case, the plurality of slots 39b may be formed to extend from a front end portion of the coupling member 39 to a rear end portion of the coupling member 39.

Accordingly, the brake booster 1 according to the embodiment of the present invention may include the plurality of slots 39b to be easily inserted when being inserted into the operation rod 13 which has a diameter greater than an inner diameter of the coupling member 39 and thus ease of operation may be secured.

Although one embodiment of the present invention is described above, the spirit of the present invention is not limited to the embodiment described in the description, and although those skilled in the art may provide other embodiments due to addition, change, or removal of the components within the scope of the same spirit of the present invention, such embodiments and the above embodiments are also included in the scope of the spirit of the present invention.

[Reference numerals]

| | |
|---|---|
| 1: brake booster | 10: poppet valve body |
| 11: valve housing | 13: operation rod |
| 13a: hook protrusion | 15: valve member |
| 17: fixing member | 30: return spring structure |
| 31: spring housing | 31a: flow hole |
| 31b: first coupling hole | 33: return spring |
| 35: retainer | 35a: second coupling hole |
| 37: support member | 37a: accommodation groove |
| 37b: air vent hole | 38: protrusion |
| 39: coupling member | 39a: hook portion |
| 39b: slot | |

The invention claimed is:

1. A brake booster comprising:
a poppet valve body configured to open a path for atmospheric pressure to be introduced into a variable pressure chamber by an operation rod linked with a brake pedal; and
a return spring structure disposed on an outer side of the poppet valve body and configured to adjust an elastic force provided to the poppet valve body when an input of the brake pedal is released,
wherein the return spring structure includes:
a return spring having a first end coupled to the outer side of the poppet valve body to provide an elastic force thereto;
a retainer having a coupling hole in a center portion thereof such that the operation rod is inserted into and coupled to the retainer, the retainer accommodating a second end of the return spring on one surface thereof; and
a spring housing coupled to the outer side of the poppet valve body and having the operation rod movably disposed in the spring housing,
wherein the retainer includes:
a support member having a plate shape with an accommodation groove, which is configured to accommodate the return spring, in one surface of the support member; and
a coupling member protruding from the one surface of the support member in an axial direction of the operation rod toward the first end of the return spring, and
wherein the return spring is disposed immediately adjacent to an inner surface of the spring housing in a direction perpendicular to said axial direction.

2. The brake booster of claim 1, wherein the coupling member protrudes from the one surface of the support member in a drum shape.

3. The brake booster of claim 1, wherein a diameter of the accommodation groove is greater than or equal to a diameter of the return spring.

4. The brake booster of claim 1, wherein the coupling member includes a hook portion formed to protrude inward from one end portion thereof, and
wherein the operation rod has a hook protrusion formed on one side thereof so that the hook portion is hooked.

5. The brake booster of claim 1, wherein the coupling member has a plurality of slots extending in said axial direction, and
wherein the plurality of slots are spaced apart from one another along a circumferential direction of the coupling member.

6. The brake booster of claim 1, wherein an air vent hole is formed in one side of the support member to prevent noises generated by irregular fluid introduction.

7. The brake booster of claim 1, wherein the spring housing has a wrinkled portion formed to be flexible in an outer surface of the spring housing.

8. The brake booster of claim 1, wherein a flow hole is formed in one surface of the spring housing so that a fluid is introduced.

\* \* \* \* \*